(12) United States Patent
Heshes et al.

(10) Patent No.: US 7,744,406 B2
(45) Date of Patent: Jun. 29, 2010

(54) USB FLASH DRIVE AND SYSTEM AND METHOD FOR STORING USB FLASH DRIVES

(75) Inventors: Hagai Heshes, Hod Hasharon (IL); Itzhak Pomerantz, Kefar Saba (IL); Erez Baum, Rehovot (IL); Menahem Lasser, Kohav Yair (IL)

(73) Assignee: SanDisk IL Ltd., Kfar Saba (IL)

( * ) Notice: Subject to any disclaimer, the term of this patent is extended or adjusted under 35 U.S.C. 154(b) by 1066 days.

(21) Appl. No.: 11/434,817

(22) Filed: May 17, 2006

(65) Prior Publication Data
US 2008/0126732 A1 May 29, 2008

Related U.S. Application Data

(60) Provisional application No. 60/762,642, filed on Jan. 30, 2006.

(51) Int. Cl.
*H01R 13/60* (2006.01)
(52) U.S. Cl. ...................................... 439/528
(58) Field of Classification Search ............... 439/528, 439/131, 133, 135, 165, 353; 312/9.48, 232.2, 312/223.2; 206/308.1, 445, 303
See application file for complete search history.

(56) References Cited

U.S. PATENT DOCUMENTS

| 4,700,839 | A | * | 10/1987 | Fujii ..................... 206/308.3 |
| 4,955,471 | A | * | 9/1990 | Hirose et al. ............. 206/303 |
| 5,718,559 | A | * | 2/1998 | Freund ..................... 414/797 |
| 5,924,564 | A | | 7/1999 | Lin |
| 6,138,824 | A | * | 10/2000 | Hyakusoku et al. ......... 206/307 |
| 6,456,500 | B1 | * | 9/2002 | Chen ....................... 361/752 |
| 6,462,952 | B1 | * | 10/2002 | Ubukata et al. ............ 361/719 |
| 6,685,014 | B1 | * | 2/2004 | Dunford .................... 206/303 |
| 6,979,210 | B2 | | 12/2005 | Regen et al. |
| 7,121,852 | B2 | * | 10/2006 | Ng et al. .................... 439/131 |
| 7,275,941 | B1 | * | 10/2007 | Bushby ..................... 439/133 |
| 2006/0073717 | A1 | * | 4/2006 | Ng et al. .................... 439/131 |

OTHER PUBLICATIONS

Notification Concerning Transmittal of Copy of International Preliminary Report on Patentability and Written Opinion of the International Searching Authority dated Mar. 19, 2009 in PCT Application No. PCT/IL2007/000097.

* cited by examiner

*Primary Examiner*—Alexander Gilman
(74) *Attorney, Agent, or Firm*—Vierra Magen Marcus & DeNiro LLP (57) ABSTRACT

The present invention discloses systems and method for storing and organizing UFDs (USB flash drives) on a storage pole, and for configuring UFDs to accommodate storage on a storage pole. Various embodiments also include configurations of the UFDs and/or storage poles which prevent rotation of the UFDs on the storage pole, thereby providing aligned stacking of the UFDs. Some embodiments include more than one pole for storage and/or alignment of the UFDs. Some embodiments do not require a pole for storage and/or alignment of the UFDs. In addition, systems which allow extraction of a single UFD from a stack of UFDs while maintaining the order of the UFDs are also disclosed.

15 Claims, 9 Drawing Sheets

USB FLASH DRIVE AND SYSTEM AND METHOD FOR STORING USB FLASH DRIVES

This patent application claims the benefit of U. S. Provisional Patent Application No. 60/762,642 filed Jan. 30, 2006.

FIELD AND BACKGROUND OF THE INVENTION

The present invention relates to a system and method for storing and organizing UFDs on a storage pole, and for configuring UFDs (USB flash drives) to accommodate storage on a storage pole.

Mechanical means for organizing small items on a desktop are well-known in the art of office accessories. A common device for organizing and holding small notes is a storage pole, available from Office Depot, 2200 Old Germantown Road, Delray Beach, Fla. 33445 (shown in FIG. 1A).

In order for a device of this type to be useful, the organized items need to have a tunnel through them that is larger than the diameter of the spindle. When the organized items are pieces of paper of different sorts, the tunnel can be made in the paper upon pushing them onto the pole.

However, when using a storage pole for organizing items other than paper (or similar items which can be pierced), the tunnel in the item needs to be made in advance. A prior art example of a storage pole for items that have tunnels to enable their organization on a pole are "dome cones", available from Goal Sporting Goods, Inc., 37 Industrial Park Road, P.O. Box 236, Essex, Conn. 06426 (shown in FIG. 1B).

UFDs are well-known in the art of digital computing as a means for portable data storage. Until recently, UFDs were relatively expensive. People would generally own a single UFD at the most. People would typically use a UFD for a variety of applications and carry the UFD with them during the day.

Recently, UFDs have become an inexpensive commodity. People can now afford to use them for dedicated purposes, and own a several UFDs. Typically, while a person would carry with him the specific UFD that he intends use, his desktop and drawers would most likely accommodate a large number of UFDs. It would be useful to have a handy and well-organized way to store UFDs, while maintaining visibility and accessibility.

A storage pole would be a convenient means for storing and organizing UFDs, if UFDs were produced with a sufficiently large tunnel around the center area of the device. Unfortunately, UFD devices are traditionally designed to be small and compact. Their circuitry is typically designed on a solid, rectangular printed circuit board. They are generally not manufactured with a sufficiently large tunnel, and cannot be drilled after production without damaging them.

For the growing community of UFD and portable data storage devices users, it would be useful to have a system for filing, organizing, sorting, and retrieving multiple UFD devices in a device similar to a storage pole.

SUMMARY OF THE INVENTION

For the purpose of clarity, several terms which follow are specifically defined for use within the context of this application. The term "storage pole" is used in this application to refer to a substantially vertical rod, supported on a base, used to organize a plurality of loose items on a desktop. The term "tunnel" is used in this application to refer to a passage through a solid object. The term "tunnel end" is used in this application to refer to the intersection of a tunnel with the outer surface of an object. According to this definition, every tunnel has two ends. The term "tunnel wall" is used in this application to refer to an interior surface, of a solid object, that encloses a tunnel passage, except at the ends of the tunnel. The term "standard CD" is used in this application to refer to a compact disc having an aperture which allows the disc to be slid onto a storage pole with a pole diameter of at least 9 mm.

It is the purpose of the present invention to teach a system for filing, organizing, sorting, and retrieving UFD devices on a storage pole.

The present invention further teaches a novel design of a printed circuit board of a UFD that accommodates a large tunnel, generally in the center of the UFD, and designed to match the diameter of storage poles that a UFD user may have available to him, thereby enabling the user to store UFDs on his storage pole. For example, CD-stack storage containers, like the ones shown in FIGS. 2A, 2B, and 2C, have a storage pole that is slightly smaller than the tunnel of a standard CD.

The invention further teaches a design for a storage pole device that enables a user to sort and select UFDs from a stack of UFDs.

The invention further teaches a design for the tunnel in a UFD that registers the angular position of the UFD on the storage pole, and ensures that a specific side of the UFD will face the user, either for decorative reasons or to expose a label area.

Therefore, according to the present invention, there is provided for the first time a UFD including: (a) a body having at least one tunnel, for storing the UFD that is substantially centered within the body.

Preferably, at least one tunnel is substantially perpendicular to a face of the body of the UFD.

Preferably, at least one tunnel is substantially cylindrical with a diameter of at least about 6 mm.

Preferably, at least one tunnel is substantially cylindrical with a diameter of at least about 8 mm.

Preferably, at least one tunnel is substantially cylindrical with a diameter of at least about 10 mm.

Preferably, at least one tunnel intersects at least one printed circuit board of the UFD.

According to the present invention, there is provided for the first time a system for storing data, the system including: (a) a storage pole; and (b) a UFD having at least one tunnel for threading the UFD on the storage pole.

Preferably, at least one tunnel is substantially cylindrical and perpendicular to a face of the UFD.

Preferably, the storage pole is substantially cylindrical with a diameter of at least about 5 mm.

Preferably, the storage pole is substantially cylindrical with a diameter of at least about 7 mm.

Preferably, the storage pole is substantially cylindrical with a diameter of at least about 9 mm.

Preferably, the storage pole is configured to be compatible with an aperture of a standard CD.

Preferably, at least one tunnel of the UFD has a diameter of at least about 6 mm.

Preferably, at least one tunnel of the UFD has a diameter of at least about 8 mm.

Preferably, at least one tunnel of the UFD has a diameter of at least about 10 mm.

Preferably, a wall of at least one tunnel is configured to interact with the storage pole in a manner that prevents rotation of the UFD around the storage pole.

Preferably, the system further includes: (c) at least one side pole for preventing rotation of the UFD along an axis of at least one tunnel, wherein a periphery of the UFD is configured to interact with at least one side pole, thereby preventing rotation of the UFD on the storage pole.

Preferably, the storage pole is configured to be in one of two states, a first state that allows removal of the UFD from the storage pole, and a second state that prevents removal of the UFD from the storage pole, the storage pole configured to be reversibly switched from the first state to the second state.

Most preferably, the UFD can freely move along the storage pole while the storage pole is in the second state.

According to the present invention, there is provided for the first time a device for data storage and retrieval, the device including a UFD having a shape configured for facilitating aligned stacking of a plurality of such UFDs.

According to the present invention, there is provided for the first time a method of packing a plurality of data storage and retrieval devices, the method including the steps of: (a) configuring each data storage and retrieval device of the plurality of data storage and retrieval devices with at least one tunnel configured to facilitate stacking of the plurality of data storage and retrieval devices; and (b) stacking the plurality of data storage and retrieval devices on a storage pole.

These and further embodiments will be apparent from the detailed description and examples that follow.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a system for a UFD organizer and a method for storing UFDs. Specifically, the present invention can be used for filing, organizing, sorting, and retrieving multiple UFDs. The present invention further includes designs for UFDs that can accommodate storage in conjunction with the system mentioned above. The principles and operation of a UFD organizer according to the present invention may be better understood with reference to the drawings and the accompanying description.

Figure 1A:
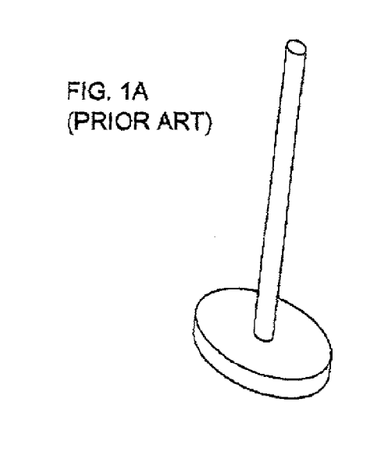
FIG. 1A shows a prior art storage pole.

Referring now to the drawings, FIG. 1A shows a prior art storage pole intended to be used with paper items. This device does not require that the items have a tunnel. The items are punctured when they are pushed onto the storage pole. This prior art device serves as the conceptual inspiration for the UFD storage device of the present invention.

Figure 1B:
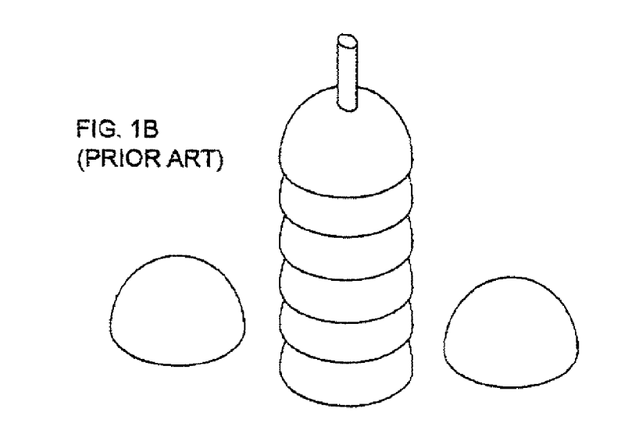
FIG. 1B shows an alternate prior art storage pole.

FIG. 1B shows a prior art storage pole used for solid objects that have a pre-fabricated tunnel.

Figure 2A:
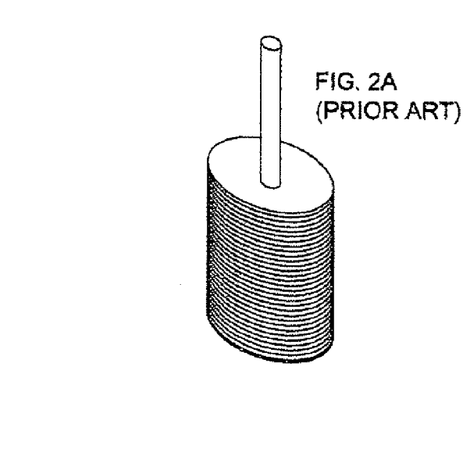
FIG. 2A shows a prior art CD-stack storage container.
Figure 2B:
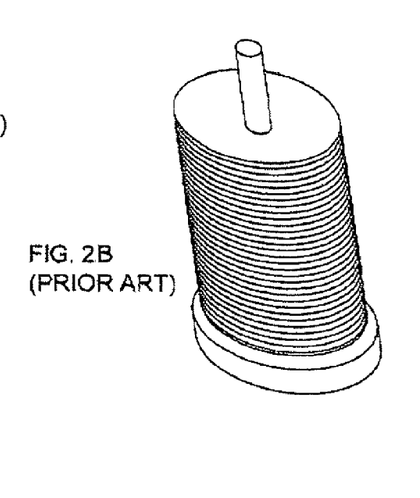
FIG. 2B shows an alternate prior art CD-stack storage container.
Figure 2C:
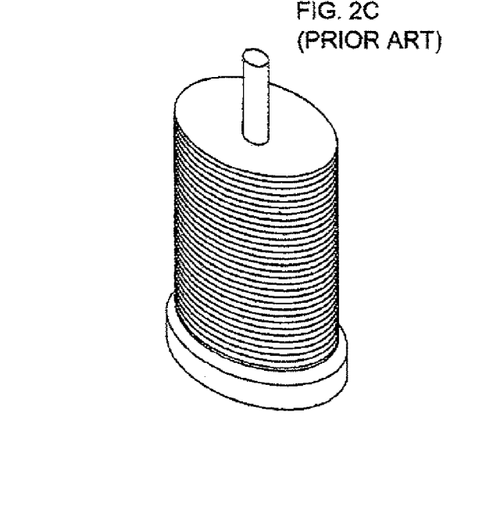
FIG. 2C shows an alternate prior art CD-stack storage container.

FIGS. 2A, 2B, and 2C show prior art devices for storing a stack of CDs. These devices include a pole and a base, and often also include a cover (not shown in these figures). In a preferred embodiment of the present invention, the diameter of the tunnel in a UFD is similar to the tunnel of a standard CD (i.e. the hole in the middle of a standard CD), with a diameter of about 10 mm, enabling standard CD-stack storage containers, with storage pole diameters of about 9 mm, to be used for the storage of UFDs.

Figure 3A:
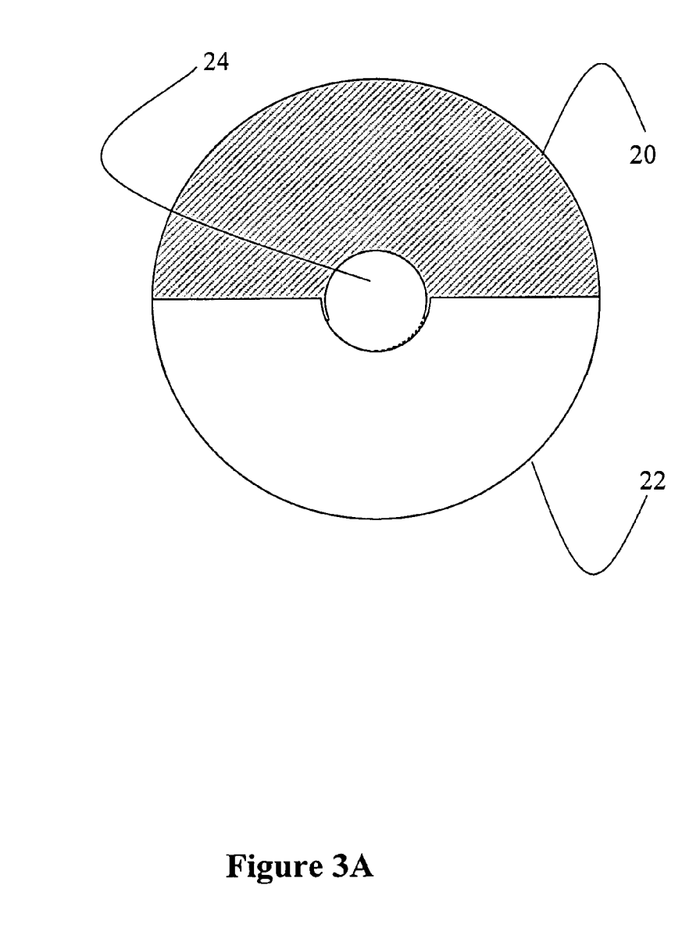
FIG. 3A shows a top view of a UFD with a tunnel suitable for placing on a storage pole.
Figure 3B:
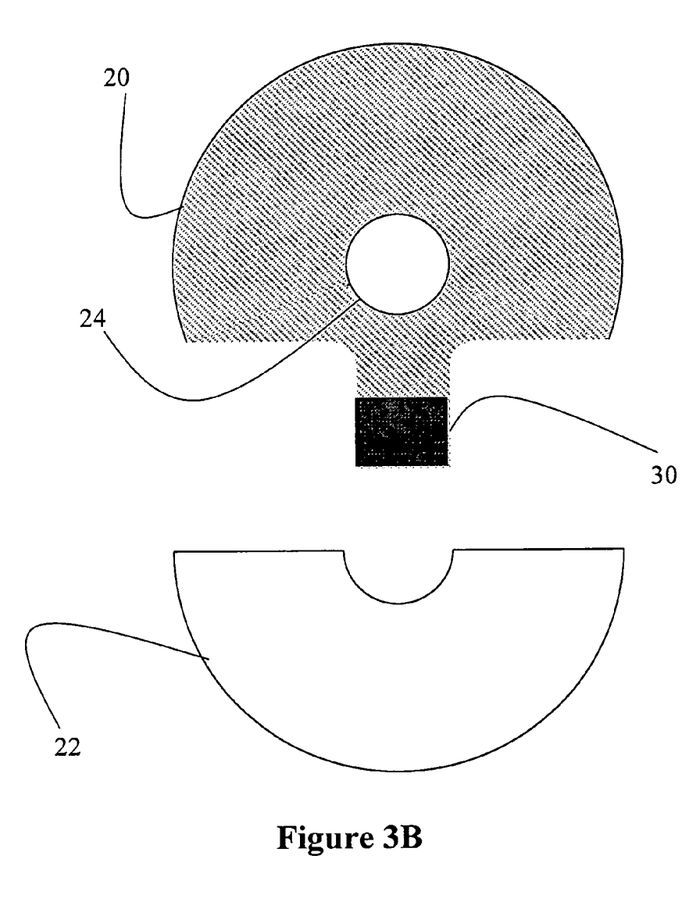
FIG. 3B shows a top view of a UFD with a tunnel suitable for placing on a storage pole with its cap removed.

FIG. 3A shows a preferred embodiment of a UFD 20 in a closed configuration, according to the present invention. UFD 20 is covered by a cap 22 which provides a round shape when UFD 20 is closed. A tunnel 24 is located in the center of UFD 20, and has a diameter that allows UFD 20 to be placed on a storage pole, such as CD storage pole (i.e. at least 10 mm). Tunnel 24 intersects at least one printed circuit board (not shown) of UFD 20. FIG. 3B shows UFD 20 with tunnel 24 and a USB connector 30. Cap 22 is shown removed from UFD 20.

Figure 4:
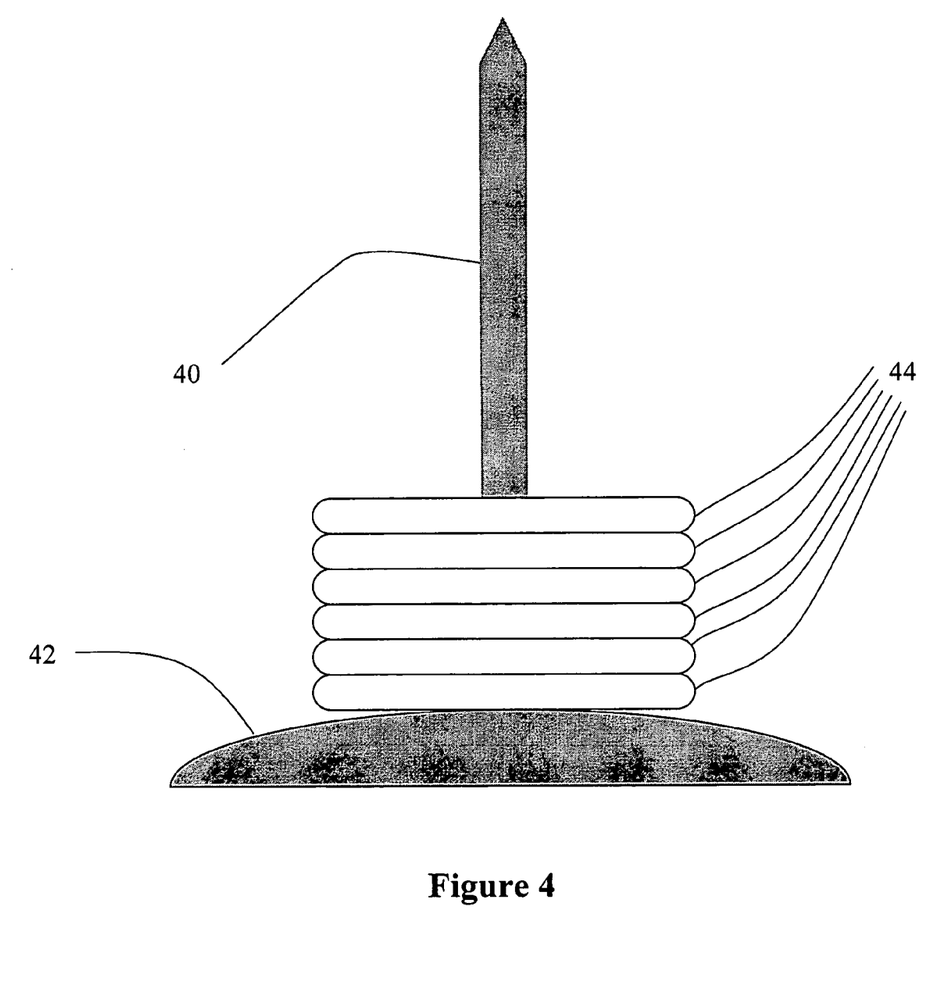
FIG. 4 shows a storage pole holding UFDs.

FIG. 4 shows a UFD organizer for UFDs according to the present invention. A storage pole 40 is located on a base 42 that is designed to accommodate a large quantity of UFDs 44. Storage pole 40 has a diameter of at least 9 mm. UFDs 44 each have a large tunnel of the type shown in FIGS. 3A and 3B.

Figure 5A:
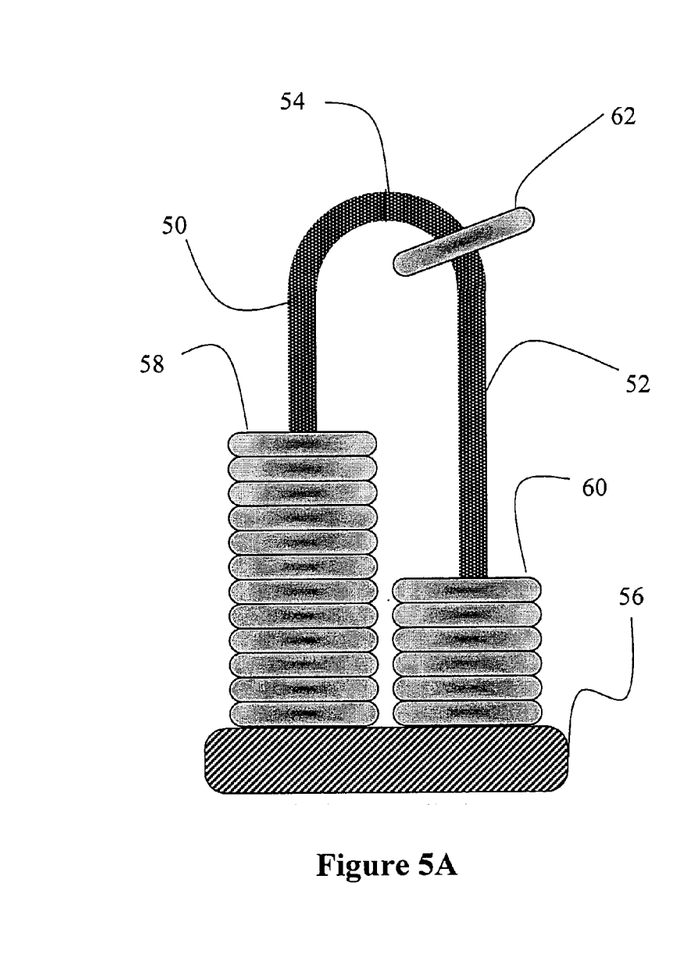
FIG. 5A shows a storage pole in its closed-loop configuration.

FIG. 5A shows a preferred embodiment of a bent storage pole, in its closed-loop configuration, which is useful for organizing UFDs of the present invention on a desktop. An "inverted U"-shaped storage pole has a left pole-half 50 and a right pole-half 52, which are both supported from a common base 56. Pole-halves 50 and 52 have a diameter of at least 9 mm, and contact each other at a bent peak seam 54. UFDs 58, having a diameter of at least 10 mm, are located on left pole-half 50, and UFDs 60 are located on right pole-half 52. A single UFD 62 is shown being transferred from left pole-half 50 to right pole-half 52.

Figure 5B:
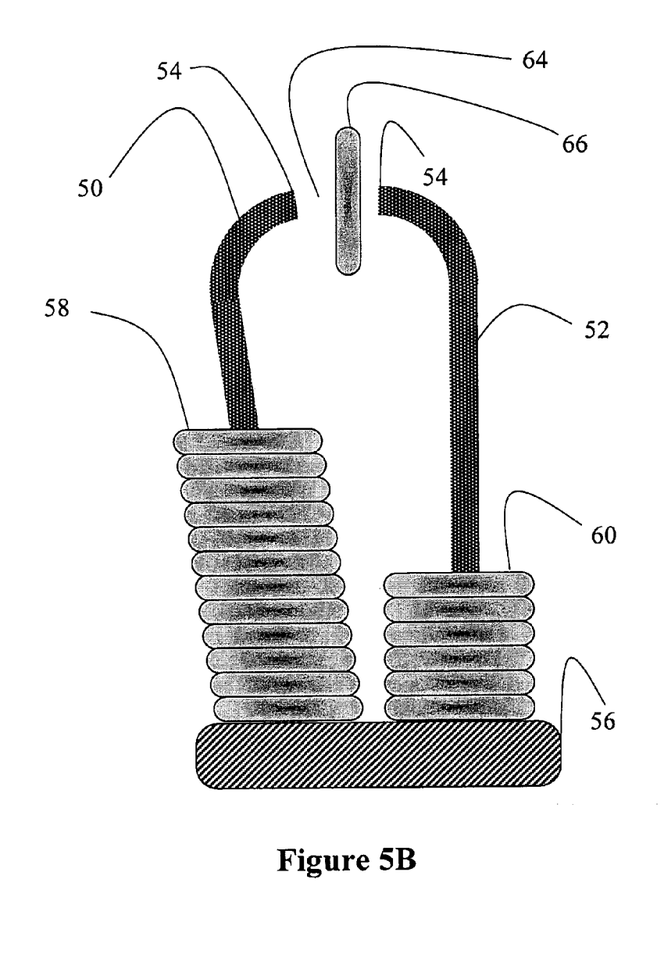
FIG. 5B shows a storage pole in its open-loop configuration.

FIG. 5B shows the bent storage pole of FIG. 5A in its open-loop configuration. Left pole-half 50 has been pulled to the left in FIG. 5B, opening peak seam 54 and creating a gap 64 between left pole-half 50 and right pole-half 52. The flexibility of pole-halves 50 and 52 can be achieved by the inherent flexibility of the storage pole material, by the localized flexibility of a joint (not shown) connecting pole-halves 50 and 52 to base 56, by base 56 being made of two parts (not shown) that can be separated from each other; or by many other ways known in the art of mechanical engineering. UFDs 58, which are threaded on left pole-half 50, remain on left pole-half 50. UFDs 60, which are threaded on right pole-half 52, remain on right pole-half 52. A loose UFD 66 is shown being released from the storage pole device. According to the storage pole device shown in FIGS. 5A and 5B, a user of this storage pole device can select and extract any UFD without changing the overall order of the UFD archive.

Figure 6:
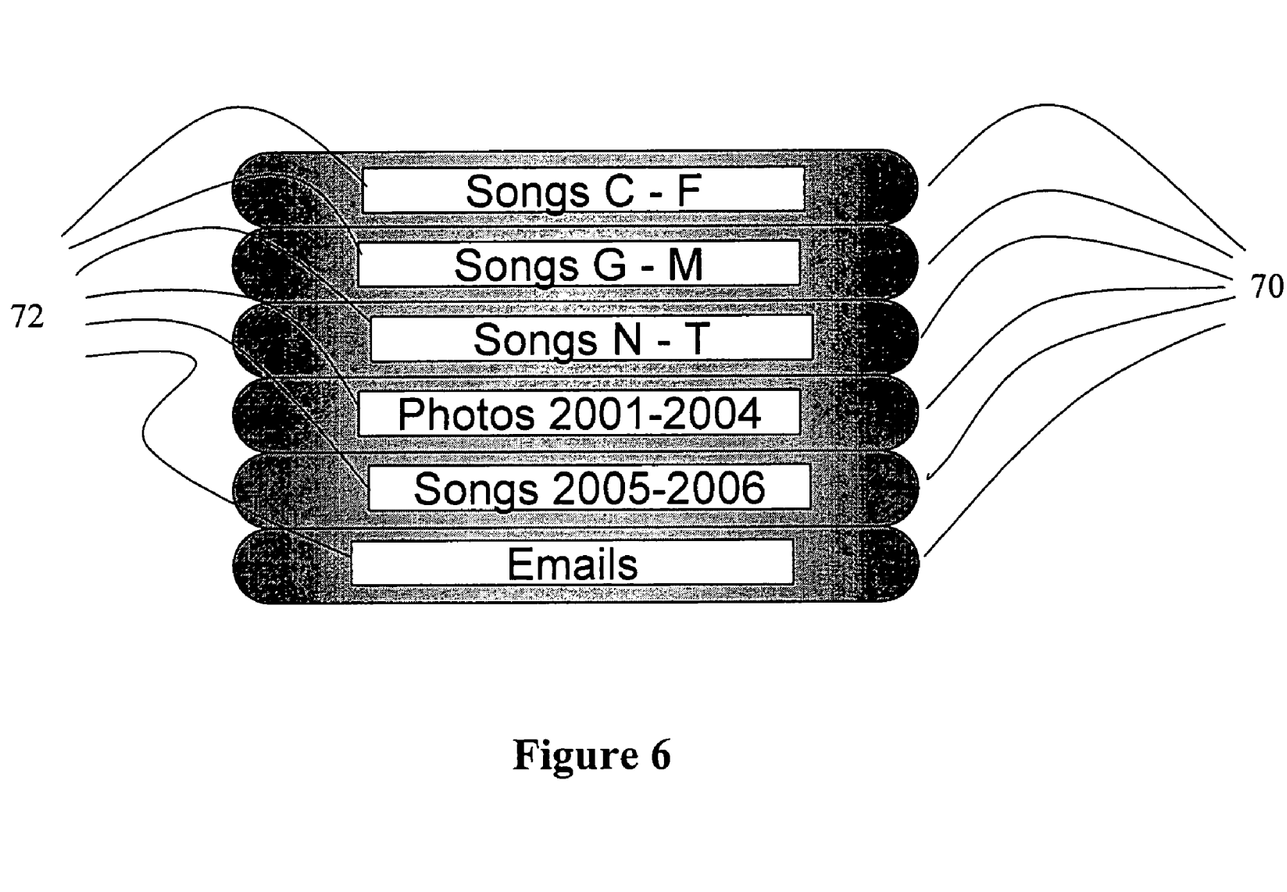
FIG. 6 shows several stacked UFDs with labels.

FIG. 6 shows several stacked UFDs 70 with each bearing a label 72 on its side, enabling a user to easily read each label 72 of stored UFDs 70 by looking at the stack. Since the tunnels of UFDs 70 are round (like tunnel 24 of UFD 20 and cap 22 shown in FIG. 3A), if UFDs 70 are stacked on a storage pole as disclosed in the present invention, then UFDs 70 can rotate in any direction. Rotation of UFDs 70 would result in the positioning of each label 72 in random directions, thereby making it difficult to view each label 72 simultaneously. This drawback is overcome in the following embodiments shown in FIGS. 7A and 7B.

Figure 7A:
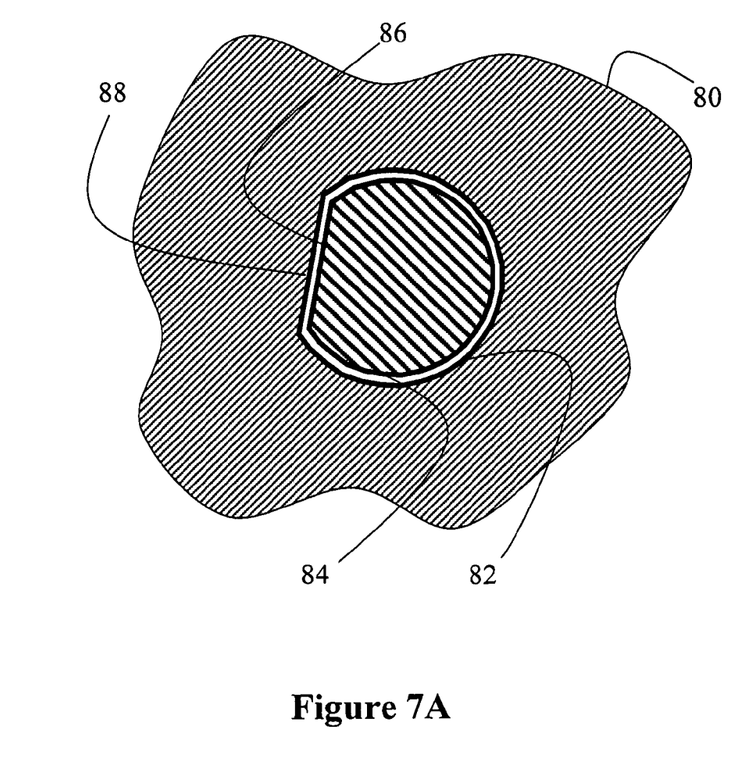
FIG. 7A shows a cross-sectional view of a UFD and storage pole with single, internal angular registration.

FIG. 7A shows a horizontal cross-sectional view through a UFD 80 (partly shown) and a storage pole 84. Storage pole 84 is slightly narrower than a tunnel 82 of UFD 80. Storage pole 84 has a straight pole-alignment key 86, and similarly, tunnel 82 of UFD 80 has a matching straight tunnel-alignment key 88. Tunnel-alignment key 88 of UFD 80 and pole-alignment key 86 of storage pole 84 must be placed in proper angular registration in order for UFD 80 to be slid onto storage pole 84. Alignment keys 86 and 88 then prevent rotation of UFD 80 on storage pole 84.

Figure 7B:
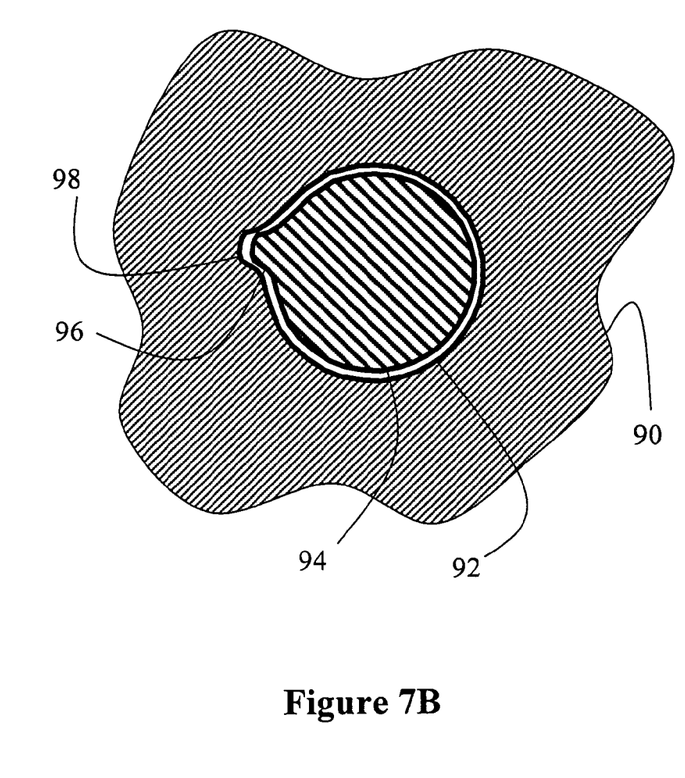
FIG. 7B shows a cross-sectional view of an alternate UFD and storage pole with single, internal angular registration.

FIG. 7B shows a horizontal cross-sectional view through an alternate UFD 90 (partly shown) and a storage pole 94. Storage pole 94 is slightly narrower than a tunnel 92 of UFD 90. Storage pole 94 has a protruding, curved pole-alignment key 96, and similarly, tunnel 92 of UFD 90 has a protruding, curved tunnel-alignment key 98. Tunnel-alignment key 98 of UFD 90 and pole-alignment key 96 of storage pole 94 must be placed in proper angular registration in order for, UFD 90 to be slid onto storage pole 94. Alignment keys 96 and 98 then prevent rotation of UFD 90 on storage pole 94. This embodiment, like the one shown in FIG. 7A, ensures that UFD 90 will not rotate and that labels of all UFDs will be readily visible.

While the embodiments of FIGS. 7A and 7B seem functionally identical to each other, there is one important difference between them. While the embodiment shown in FIG. 7B enables the use of UFD 90 on generic storage poles which are completely round, UFD 80 (of the embodiment shown in FIG. 7A) will not accommodate storage poles which are completely round, thereby requiring a specially-designed storage pole for UFD 80.

Figure 8A:
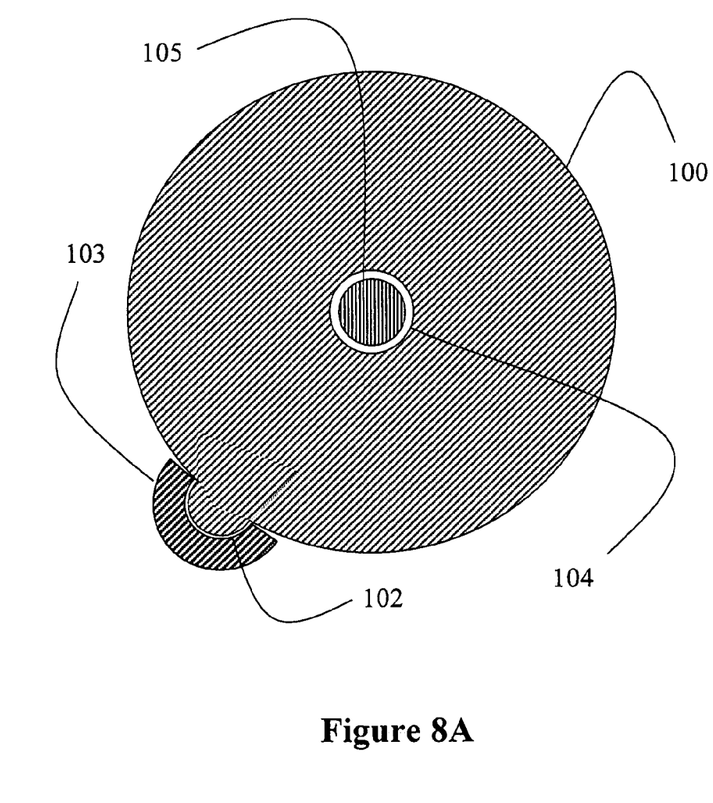
FIG. 8A shows a cross-sectional view of a UFD and a storage pole with single, external angular registration.

While the preferred embodiments described above teach how to make a substantially-cylindrical UFD whose tunnel wall is configured to prevent rotation of the UFD when engaged on an appropriate storage pole, it should be understood that a similar configurational change can be made to the periphery of a substantially-cylindrical UFD. A UFD organizer of this type can be achieved in several ways. As shown in FIG. 8A, a UFD 100 has a protrusion 102 on the periphery of UFD 100.

An appropriately-shaped alignment pole 103, matching the contour of protrusion 102, secures UFD 100 to the UFD organizer. A tunnel 104 located in UFD 100 is used to slide UFD 100 onto a conventional storage pole 105. In this embodiment, UFD 100 will not slide onto alignment pole 105 without proper alignment of protrusion 102 and alignment pole 103.

Figure 8B:
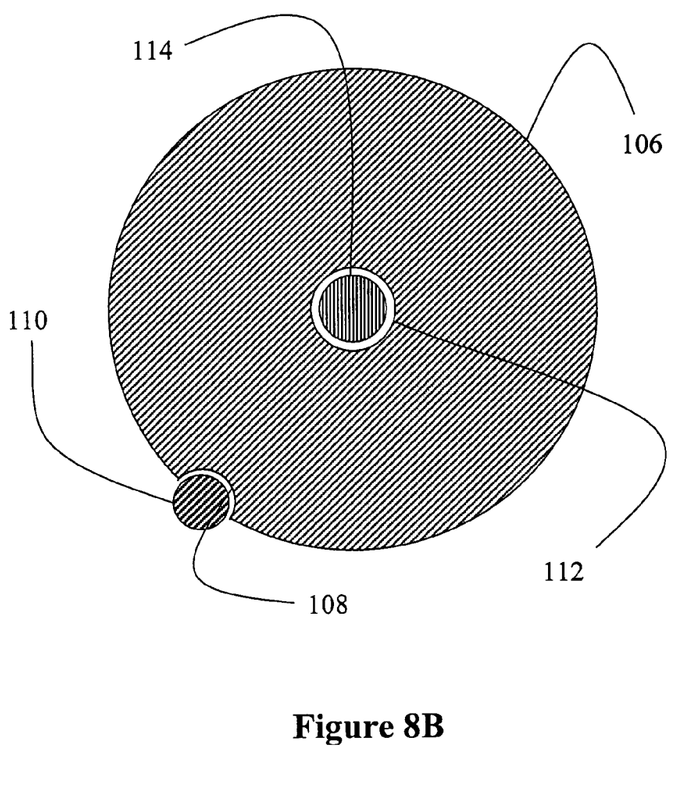
FIG. 8B shows a cross-sectional view of an alternate UFD and a storage pole with single, external angular registration.

Similarly, as shown in FIG. 8B, a UFD 106 has an indented niche 108 on the periphery of UFD 106. An appropriately-shaped alignment pole 110, matching the contour of niche 108, secures UFD 110 to the UFD organizer. A tunnel 112 located in UFD 106 is used to slide of UFD 106 onto a conventional storage pole 114. In this embodiment, UFD 106 will not slide onto alignment pole 114 without proper alignment of niche 108 and alignment pole 110.

Figure 9A:
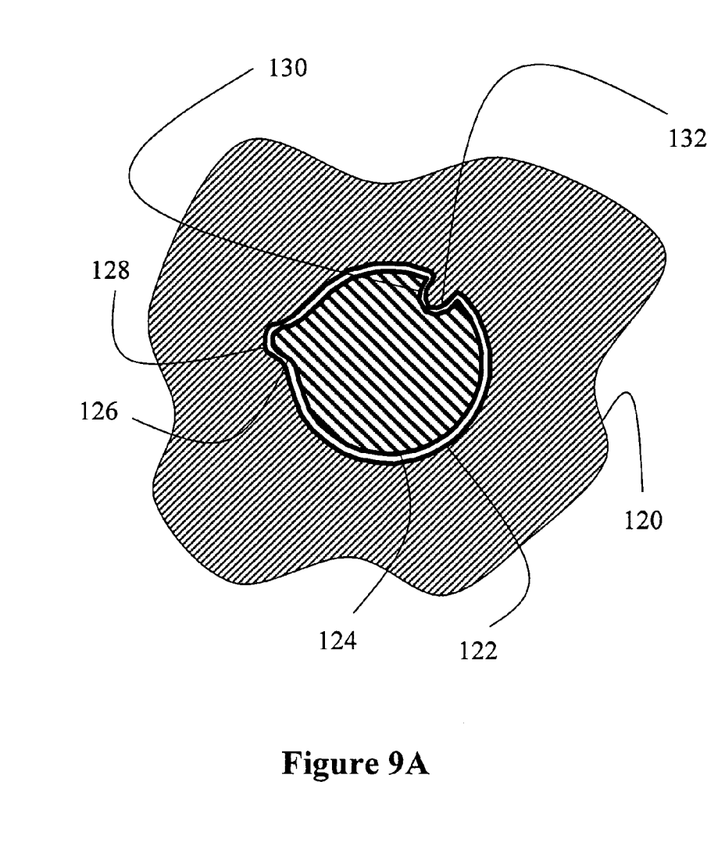
FIG. 9A shows a cross-sectional view of an alternate UFD and storage pole with dual, internal angular registration.

Furthermore, FIG. 9A shows a cross-sectional view of an alternate UFD 120 and storage pole 124 with dual, internal angular registration. Similar to the embodiment shown in FIG. 7B, storage pole 124 is slightly smaller than a tunnel 122 of UFD 120. Storage pole 124 has a protruding, curved pole-alignment key 126, and similarly, tunnel 122 of UFD 120 has a protruding, curved tunnel-alignment key 128. When tunnel-alignment key 128 of UFD 120 and pole-alignment key 126 of storage pole 124 are in proper angular registration, rotation of UFD 120 on storage pole 124 is prevented. Storage pole 124 also has an indented pole-niche 130.

Likewise, UFD 120 also has a corresponding, indented tunnel-niche 132 on the internal surface of UFD 120. In this embodiment, UFD 120 will not slide onto storage pole 124 without proper alignment of pole-alignment key 126 with tunnel-alignment key 128 and pole-niche 130 with tunnel-niche 132.

Figure 9B:
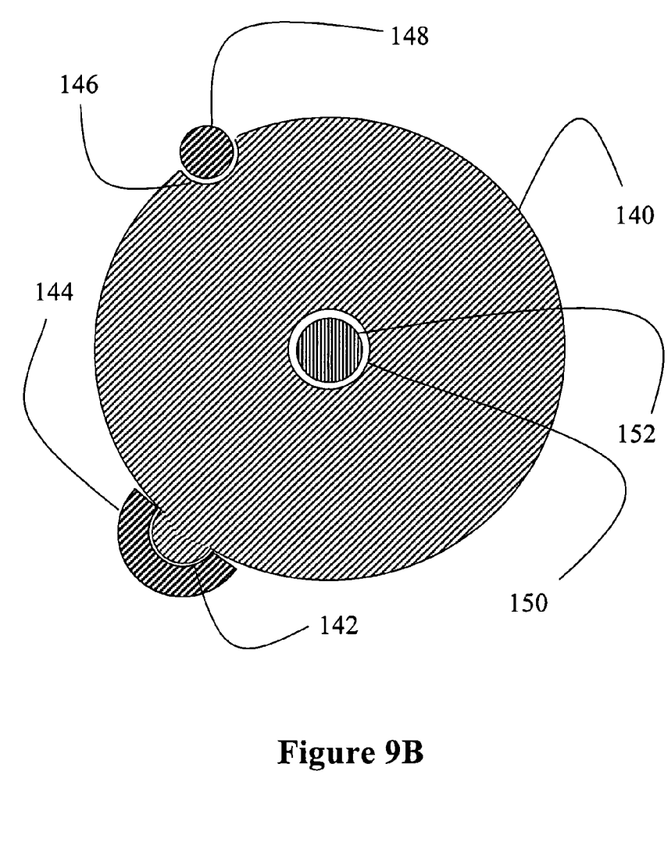
FIG. 9B shows a cross-sectional view of an alternate UFD and storage poles with dual, external angular registration.

FIG. 9B shows a cross-sectional view of an alternate UFD 140, a primary alignment pole 144, and a secondary alignment pole 148 with dual, external angular registration. Similar to the embodiments shown in FIGS. 8A and 8B, UFD 140 has a protrusion 142 and an indented niche 146 on the periphery of UFD 140. Primary alignment pole 144, matching the contour of protrusion 142, and secondary alignment pole 148, matching the contour of niche 146, secure UFD 140 to the UFD organizer. In this embodiment, UFD 140 will not slide onto primary alignment pole 144 and secondary alignment pole 148 without proper alignment of protrusion 142 and niche 146 with primary alignment pole 144 and secondary alignment pole 148, respectively. A tunnel 150 located in UFD 140 is available for storage of UFD 140 on a conventional storage pole 152.

In addition to preventing rotation of the UFDs, the dual registration embodiments of FIGS. 9A and 9B eases the movement of the UFDs along the storage pole by making a UFD slide only along the axis of the storage pole without canting the UFD, minimizing contact between the tunnel wall and the storage pole, to a greater extent than in the single registration embodiments shown in FIGS. 7A through 8B. Further embodiments can be considered in which a plurality of protrusions and niches, both internal and external, are present for various applications.

Figure 10:
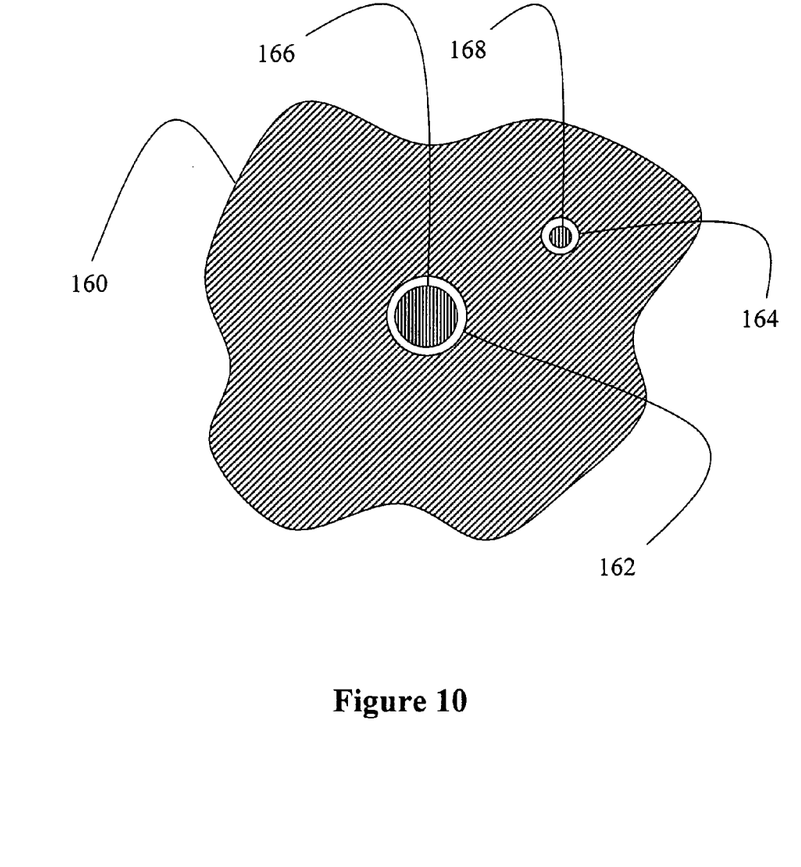
FIG. 10 shows a cross-sectional view of an alternate UFD with two tunnels for internal angular registration.

FIG. 10 shows a cross-sectional view of an alternate UFD with two tunnels for internal angular registration. A UFD 160 has a storage-pole tunnel 162 for storage on a standard, CD storage pole (not shown). UFD 160 also has an alignment tunnel 164 for preventing rotation of UFD 160 when stored on a storage-pole device having two poles when storage-pole tunnel 162 and alignment tunnel 164 are both engaged on a conventional storage pole 166 and an alignment pole 168. It is appreciated that alignment tunnel can be dimensioned to have various shapes and sizes, and can be located anywhere in UFD 160. In preferred embodiments, UFD 160 can have more than one alignment tunnel 164.

While the most natural location of a tunnel is in the center of a UFD, the UFD taught by the present invention can have a tunnel in any location. It is noted that the shape of a CD, which may be desirable in order to conform to established market standards, is maintained when the tunnel is generally located in the central area of the UFD. More specifically, the CD shape is maintained if the center of the minimum encompassing sphere of the UFD is located in the tunnel.

Figure 11:
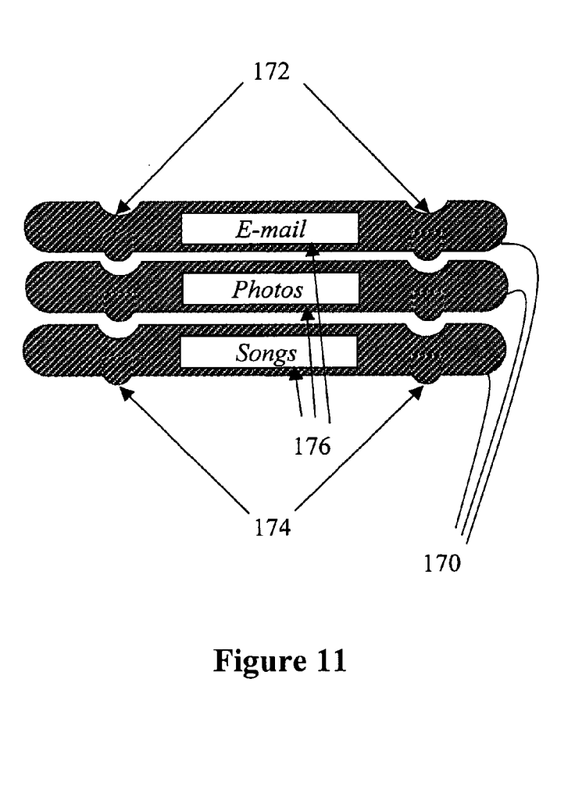
FIG. 11 shows a cross-sectional view of an alternate UFD configuration for surface angular registration.

FIG. 11 shows a cross-sectional view of an alternate UFD configuration for surface angular registration. UFDs 170 have indentations 172 and protrusions 174 located on opposite surfaces of UFDs 170. When UFDs 170 are placed on top of each other with proper surface angular registration of indentations 172 and protrusions 174, rotation of UFDs 170 is prevented, allowing for aligned stacking of UFDs 170 and adequate viewing of UFD labels 176.

It is appreciated that in the above embodiments which prevent rotation of the UFDs, the tunnels and corresponding storage poles can be configured in numerous ways that prevent rotation. For example, triangular, square, and hexagonal tunnels and poles are all shapes that are within the domain of the present invention, among others.

While the invention has been described with respect to a limited number of embodiments, it will be appreciated that many variations, modifications, and other applications of the invention may be made.

What is claimed is:

1. A system for storing Universal Serial Bus Flash Drives (UFDs), the system comprising:
    (a) a storage pole;
    (b) a UFD having a body that houses electronic circuitry, the UFD has a Universal Serial Bus (USB) connector that is electrically coupled to the electronic circuitry, the body has at least one tunnel for threading said UFD on said storage pole; and
    (c) at least one side pole for preventing rotation of said UFD along an axis of said at least one tunnel, wherein a periphery of said UFD has a deviation that is configured to interact with said at least one side pole, thereby preventing rotation of said UFD on said storage pole, wherein said deviation is a protrusion on said periphery.

2. The system of claim 1, wherein said at least one tunnel is substantially cylindrical and perpendicular to a face of said UFD.

3. The system of claim 1, wherein said storage pole is substantially cylindrical with a diameter of at least about 5 mm.

4. The system of claim 1, wherein said storage pole is substantially cylindrical with a diameter of at least about 7 mm.

5. The system of claim 1, wherein said storage pole is substantially cylindrical with a diameter of at least about 9 mm.

6. The system of claim 1, wherein said storage pole is configured to be compatible with an aperture of a standard CD.

7. The system of claim 1, wherein said at least one tunnel of said UFD has a diameter of at least about 6 mm.

8. The system of claim 1, wherein said at least one tunnel of said UFD has a diameter of at least about 8 mm.

9. The system of claim 1, wherein said at least one tunnel of said UFD has a diameter of at least about 10 mm.

10. The system of claim 1, wherein a wall of said at least one tunnel is configured to interact with said storage pole in a manner that prevents rotation of said UFD around said storage pole.

11. The system of claim 1, wherein said storage pole is configured to be in one of two states, a first said state that allows removal of said UFD from said storage pole, and a second said state that prevents removal of said UFD from said storage pole, said storage pole configured to be reversibly switched from said first state to said second state.

12. The system of claim 11, wherein said UFD can freely move along said storage pole while said storage pole is in said second state.

13. A method of storing Universal Serial Bus Flash Drives (UFDs), the method comprising the steps of:
    (a) configuring each UFD of a plurality of UFDs that each have a body with at least one tunnel in the body configured to facilitate storing the plurality of UFDs on a storage pole, wherein the body of each of the plurality of UFDs has a first major surface and a second major surface that are opposite each other, the first major surface has one or more indentations, the second major surface has one or more protrusions, the storing the plurality of UFDs includes storing the first major surfaces next to the second major surfaces such that the indentations are aligned with the protrusions; and
    (b) providing said storage pole for storing the plurality of UFDs on said storage pole.

14. A system for storing Universal Serial Bus Flash Drives (UFDs), the system comprising:
    (a) a storage pole; and
    (b) a plurality of UFDs that each have a body with at least one tunnel in the body configured to facilitate storing the plurality of UFDs on the storage pole, wherein the body of each of the plurality of UFDs has a first major surface and a second major surface that are opposite each other, the first major surface has one or more indentations, the second major surface has one or more protrusions, the plurality of UFDs are stored with the first major surfaces next to the second major surfaces such that the indentations are aligned with the protrusions.

15. A method for storing Universal Serial Bus Flash Drives (UFDs), the method comprising:
    providing a storage pole;
    providing a UFD having a body that houses electronic circuitry, the UFD has a Universal Serial Bus (USB) connector that is electrically coupled to the electronic circuitry, the body has at least one tunnel for threading the UFD on the storage pole; and
    providing at least one side pole for preventing rotation of the UFD along an axis of the at least one tunnel, wherein a periphery of the UFD has a deviation that is configured to interact with the at least one side pole, thereby preventing rotation of the UFD on the storage pole, wherein the deviation is a protrusion on the periphery.

* * * * *